US009390335B2

(12) United States Patent
Lee

(10) Patent No.: US 9,390,335 B2
(45) Date of Patent: Jul. 12, 2016

(54) METHOD AND SERVICE SERVER FOR PROVIDING PASSENGER DENSITY INFORMATION

(71) Applicant: Foundation of Soongsil University-Industry Cooperation, Seoul (KR)

(72) Inventor: Kang Hee Lee, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/603,747

(22) Filed: Jan. 23, 2015

(65) Prior Publication Data

US 2016/0125248 A1 May 5, 2016

(30) Foreign Application Priority Data

Nov. 5, 2014 (KR) .................. 10-2014-0152931

(51) Int. Cl.
*G06K 9/00* (2006.01)
*G06T 7/20* (2006.01)
*G06T 7/60* (2006.01)

(52) U.S. Cl.
CPC ........ *G06K 9/00778* (2013.01); *G06K 9/00838* (2013.01); *G06T 7/20* (2013.01); *G06T 7/602* (2013.01)

(58) Field of Classification Search
USPC .......................................... 382/103
See application file for complete search history.

(56) References Cited

U.S. PATENT DOCUMENTS

| 5,176,082 A | * | 1/1993 | Chun | B61B 1/02 104/28 |
| 8,238,603 B1 | * | 8/2012 | Golan | G06K 9/00778 348/169 |
| 2008/0106599 A1 | * | 5/2008 | Liu | G06K 9/00362 348/143 |
| 2011/0115920 A1 | * | 5/2011 | Wang | G06K 9/00778 348/169 |
| 2014/0375808 A1 | * | 12/2014 | Kao | H04N 7/18 348/148 |
| 2015/0085111 A1 | * | 3/2015 | Lavery | H04N 21/21805 348/143 |
| 2015/0262006 A1 | * | 9/2015 | Yomogida | G06K 9/00369 705/14.62 |

* cited by examiner

*Primary Examiner* — John Strege
(74) *Attorney, Agent, or Firm* — Mintz Levin Cohn Ferris Glovsky and Popeo, P.C.; Kongsik Kim; Jonathon Western

(57) ABSTRACT

A method and service server for providing passenger density information are provided. The service server for providing passenger density information of a car according to an embodiment of the invention may include: a motion vector detection unit that detects motion vectors generated by the movements of passengers from a captured image of the inside of the car; a head recognition unit that recognizes the heads of passengers from the image; and a density information generation unit that generates the passenger density information of the car by using one or more of the motion vectors, a result of head recognition of the passengers, and tag sensor information received from sensors installed in the car.

14 Claims, 9 Drawing Sheets

METHOD AND SERVICE SERVER FOR PROVIDING PASSENGER DENSITY INFORMATION

CROSS-REFERENCE TO RELATED APPLICATIONS

This application claims the benefit of Korean Patent Application No. 10-2014-0152931, filed with the Korean Intellectual Property Office on Nov. 5, 2014, the disclosure of which is incorporated herein by reference in its entirety.

BACKGROUND

1. Technical Field

The present invention relates to a method and service server for providing passenger density information, more particularly to a method and service server for providing the density information of passengers in a car.

2. Description of the Related Art

A metropolitan mass transit system uses trains composed of multiple cars. Generally, a passenger waiting for a train on the platform does not know the level of crowdedness in each car (passenger car), and a passenger on a train does not know the levels of crowdedness in cars other than the one in which the passenger is riding.

As a result, the passengers on a train may not disperse into other cars, and a train may include cars having high levels of crowdedness and cars having low levels of crowdedness.

What is more, it is difficult to ascertain the level of crowdedness in a car for the driver of the train or even the operator managing the mass transit system.

Meanwhile, the intervals between trains may be kept at constant times. However, it would be more desirable in terms of the convenience of the passengers if the distances from a particularly crowded train to a preceding and/or succeeding train were shortened in order that the passengers may be suitably distributed over the respective trains.

The problem above also applies to the cases of buses.

That is, the passengers waiting for a bus at a bus stop do not know how crowded the buses are, so that even if multiple bus lines are available to a passenger, or if two buses of the same line reach the bus stop at the same time, the passenger is not able to easily select the bus that is less crowded.

In the case of buses also, it would be more desirable in terms of the convenience of the passengers if the distances from a particularly crowded bus to a preceding and/or succeeding bus were shortened in order that the passengers may be suitably distributed over the respective buses.

However, in order to adjust the operating intervals as above, the levels of crowdedness of the cars of a train (or buses) must be known accurately.

To this end, a method of providing the density level of passengers as an approximated value (for example, as a percentage) was proposed which applies a system of weight estimation system using load cells to a mass transit train or a bus to measure the changes in weight loads.

However, such approximated values provide an ambiguous basis for estimating the passenger density information and can increase the confusion of a user making a subjective judgment.

SUMMARY

To resolve the problems above, an aspect of the invention aims to provide accurate information on passenger density for the cars of mass transit trains or buses.

To achieve the objective above, an embodiment of the invention provides a service server for providing passenger density information of a car that includes: a motion vector detection unit that detects motion vectors generated by the movements of passengers from a captured image of the inside of the car; a head recognition unit that recognizes the heads of passengers from the image; and a density information generation unit that generates the passenger density information of the car by using one or more of the motion vectors, a result of head recognition of the passengers, and tag sensor information received from sensors installed in the car.

To achieve the objective above, an embodiment of the invention provides a method by which a service server provides passenger density information of a car that includes: detecting motion vectors generated by movements of passengers from a captured image of an inside of a car; recognizing heads of passengers from the image; and generating the passenger density information of the car by using one or more of the motion vectors, a result of head recognition of the passengers, and tag sensor information received from sensors installed in the car.

With an embodiment of the invention, it is possible to provide passenger density information with greater accuracy for each car of a mass transit train or for a bus.

Also, by having the passengers distributed over different cars, the delays experienced by trains or buses can be reduced during times of high levels of crowdedness such as morning and evening rush hours.

Also, passengers can use a train or bus in a comfortable environment, with higher levels of safety for the elderly and handicapped.

Also, an embodiment of the invention can help prevent incidents that may occur in crowded places (e.g. pickpocketing, sexual molestation, etc.) and other accidents.

Also, since the passengers can be dispersed over the cars of a train, the likelihood of malfunctioning of the train can be reduced, contributing to the lengthening of the train's life expectancy.

Additional aspects and advantages of the present invention will be set forth in part in the description which follows, and in part will be obvious from the description, or may be learned by practice of the invention.

DETAILED DESCRIPTION

Figure 1:
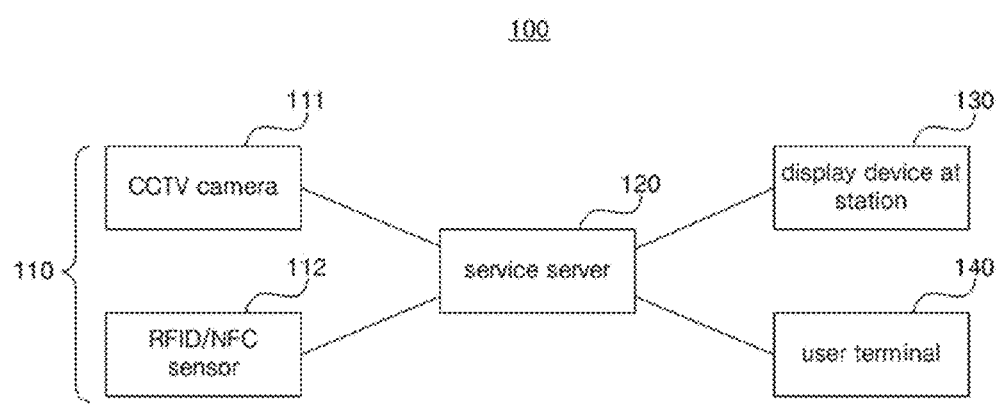
FIG. 1 illustrates a system for providing passenger density information according to an embodiment of the invention.

The present invention will be described below with reference to the accompanying drawings. However, the present invention can be implemented in several different forms and is not limited to the embodiments described herein.

In order to describe embodiments of the present invention with greater clarity, certain parts have been omitted in the drawings, and like reference numerals have been used for like parts throughout the specification.

In the specification, the description that a part is "connected" to another part refers not only to those cases in which the parts are "connected directly" but also to those cases in which the parts are "connected indirectly" by way of one or more other members interposed therebetween.

Also, the description that a part "includes" a component means that additional components may further be included and does not preclude the existence of other components unless specifically indicated.

Certain embodiments of the invention will now be described in more detail with reference to the accompanying drawings.

FIG. 1 illustrates a system for providing passenger density information according to an embodiment of the invention.

A system 100 for providing passenger density information according to an embodiment of the invention (hereinafter referred to as 'passenger density information system') can include a density information measurement device 110, a service server 120, a display device 130 at a station, and a user terminal 140.

The passenger density information system 100 based on an embodiment of the invention can be applied to a transport system such as the subway or bus systems. The descriptions that follow will be provided for an example in which the embodiments of the invention are applied to a subway system.

Looking at each component, the density information measurement device 110 can include a CCTV camera 111, an RFID/NFC sensor 112, etc.

The CCTV camera 111 can be installed in each car of a train, to capture an image of the inside of the car (hereinafter referred to as an 'image of inside the car'), and transmit the image to the service server 120.

The RFID/NFC sensor 112 can be installed near an entrance to the car, to sense the boarding of passengers carrying user terminals that include RFID/NFC tags, and transmit the tag sensor information, which may include the information of the sensed tags, to the service server 120.

Here, the 'tag sensor information' can include one or more of an identifier of the car in which the RFID/NFC sensor 112 is installed, an identifier of the corresponding sensor, and an identifier of the sensed RFID/NFC tag.

Also, the RFID/NFC sensor 112 can be installed on the floor of the car, in which case the RFID/NFC sensor 112 may sense an RFID/NFC tag when a passenger wearing smart shoes or an antenna band, etc., including the RFID/NFC tag is positioned on the corresponding floor area, and transmit the tag sensor information to the service server 120.

The RFID/NFC sensor 112 can attempt to sense tags periodically (for example, when stopping at each station or in particular intervals) and transmit the tag sensor information to the service server 120.

The service server 120 can generate passenger density information for each car based on the information received from the density information measurement device 110 and provide the passenger density information to one or more of the display device 130 at the station and the user terminal 140.

For example, the service server 120 can receive the image of inside the car from the CCTV camera 111, detect motion vectors that are generated according to the movements of the passengers from the received image, and reflect the motion vectors in generating the passenger density information for each car.

Also, the service server 120 can recognize the heads of the passengers by detecting head colors from the image of inside the car and filtering by size, and can reflect the results when estimating the number of passengers in the car.

Also, the service server 120 can calculate the amount of exposed floor area from the image of inside the car to estimate the floor area within the car that is occupied by passengers, and reflect the result in generating the passenger density information for each car.

Also, the service server 120 can reflect the sensor information received from the RFID/NFC sensors 112 in generating the passenger density information for each car.

For example, the tag sensor information received from RFID/NFC sensors 112 installed near the entrances to the car can be used in determining the number of passengers in the car, and the sensor information received from RFID/NFC sensors 112 installed on the floor of the car can be used in estimating the area of floor space occupied by passengers.

In this way, the service server 120 can generate the passenger density information for each car based on one or more of the motion vectors generated according to the movements of the passengers, the results of head recognition of the passengers, the area of exposed floor space in the image of inside the car, and the tag sensor information utilizing RFID/NFC sensors 112.

The service server 120 can process errors in the passenger density information of each car by using a learning algorithm (e.g. the error back-propagation algorithm) to reduce the error range and accumulate data, to provide highly accurate estimates of the number of passengers in each car, rather than vague approximates.

Also, the service server 120 can provide the passenger density information of each car to the display devices 130 at the station and to user terminals 140.

Here, the 'passenger density information for each car' can include one or more of an estimated number of passengers and a passenger density level in each car (where the density level can be represented by ranks or colors) and can further include information related to unoccupied seats.

A display device 130 at a station can be installed at the platform of the station, within a car, or along passageways such as stairs or elevators, etc., and can receive the passenger density information of each car of a train from the service server 120 and display it on a screen.

The passengers can check the passenger density information of each car for a particular train on a display device 130 at the station and use a car having a low passenger density level, as a result of which the passengers can be suitably distributed over the cars of the train.

A user terminal 140 can access the service server 120 for checking the stations and the operating schedules at a corresponding station as well as for requesting the passenger density information of each car of each train. The user terminal 140 can receive the passenger density information for each car of a particular train from the service server 120 and show it on the screen.

A more detailed description of the passenger density information displayed on the user terminal 140 will be provided later on with reference to FIG. 5A and FIG. 5B.

The user terminal 140 can include devices that can access the service server 120 over a network such as smart phones, cell phones, PDA, PMP, wearable devices (smart watches, etc.), tablet computers, laptop computers, desktop computers, IPTV connected with set-top boxes, and the like.

Figure 2:
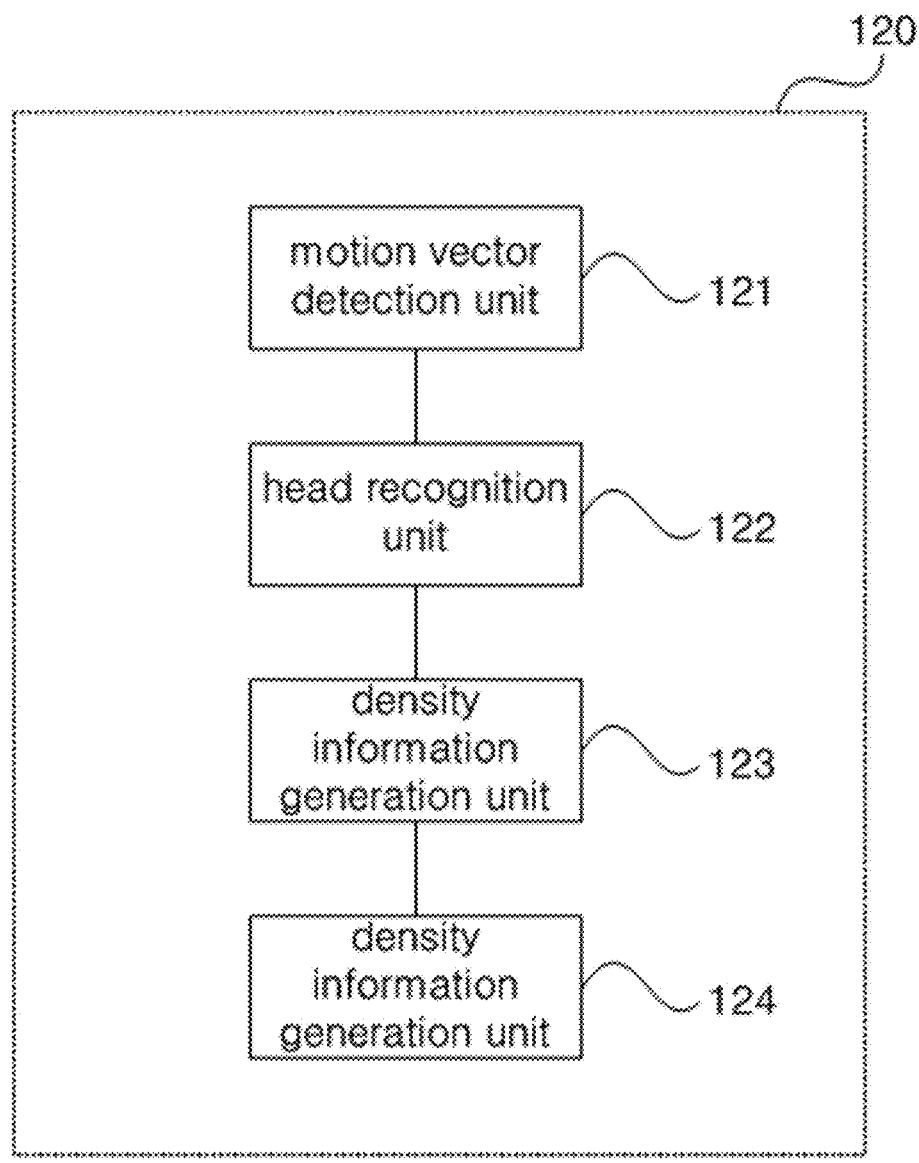
FIG. 2 is a block diagram illustrating the composition of a service server according to an embodiment of the invention.

FIG. 2 is a block diagram illustrating the composition of a service server according to an embodiment of the invention.

A service server 120 according to an embodiment of the invention can include a motion vector detection unit 121, a head recognition unit 122, a density information generation unit 123, and a density information provider unit 124.

Looking at each component, the motion vector detection unit 121 can detect motion vectors that are generated by the movements of the passengers from the image received from the CCTV camera 111, i.e. the image of inside the car.

The head recognition unit 122 can recognize the heads of the passengers from the image of inside the car received from the CCTV camera 111.

The head recognition unit 122 can recognize the heads of the passengers by detecting head colors from the image of inside the car and then filtering by size.

To this end, the reference values for filtering by head color and size can be set beforehand, such as the head colors, and the aspect ratios of heads and head widths for filtering by head sizes, and the like.

For example, the head colors can be black and brown (of course, other colors are also possible), the aspect ratios for head shapes can be between 1:1 and 2:1 for elliptical shapes, and the head widths can be set with an average of 156.38 mm, a minimum value of 122 mm, and a maximum value of 191 mm for a typical Korean adult man, and with an average of 147.24 mm, a minimum value of 120 mm, and a maximum value of 186 mm for a typical adult woman.

The density information generation unit 123 can generate the passenger density information of each car by using one or more of the motion vectors detected by the motion vector detection unit 121, the heads of the passengers recognized by the head recognition unit 122, and the tag sensor information received periodically from the RFID/NFC sensors 112.

Here, the density information generation unit 123 can remove redundant tag information from the tag sensor information received periodically, so that even when certain passengers are sensed repeatedly within the same car, the number of passengers can be identified with high accuracy.

Also the density information generation unit 123 can estimate the floor area occupied by passengers in the car by calculating the area of the floor within the car that is exposed from the image of inside the car, and reflect the result when generating the passenger density information.

For example, if it is highly crowded in the car, the number of passengers occupying the floor in the car would be high, and as a result, the area of exposed floor space (the color of the floor) in the image of inside the car would not be large.

Conversely, if it is not very crowded in the car, the number of passengers occupying the floor in the car would not be high, so that the area of exposed floor space (the color of the floor) in the image of inside the car would be large.

Also, the density information generation unit 123 can apply different weights when generating the passenger density information of each car by using one or more of the motion vectors, the recognized heads of the passengers, and the tag sensor information.

For example, the weights can be applied differently according to the time of day at which the train is running.

That is, between 7 and 10 o'clock in the morning on weekdays, many of the passengers would be young office workers, so that there may be more black or brown head colors, and the accuracy of head recognition for the passengers may be higher.

In this case, the weight applied for the head recognition can be set higher than the weights for the motion vectors and tag sensor information in generating the passenger density information of each car.

Also, between 10 and 11 o'clock in the morning on weekdays, there may be more senior citizens who may take advantage of free transit passes and who have come to enjoy more active lifestyles in recent times, so that there may be more grey head colors rather than black or brown, and the accuracy of head recognition based on black and brown head colors may be somewhat lower.

In this case, the weight applied for the motion vectors can be set higher than the weights for the head recognition and tag sensor information in generating the passenger density information of each car.

Likewise, the weights can be set differently for each month (or other period).

In warmer seasons (weather) such as summer, the passengers may wear brightly colored tops and may not wear hats, so that the accuracy of head recognition for the passengers can be higher.

In this case, the weight for the head recognition can be set higher than the weights for the motion vectors and the tag sensor information.

However, in colder seasons (weather) such as winter, the passengers may wear dark colored jackets and coats and may wear hats, etc., so that the accuracy of head recognition for the passengers can be lower.

In this case, the weight for the motion vectors can be set higher than the weights for the head recognition and the tag sensor information.

Moreover, the weights can also be set differently according to the operating region (running path), etc., of the train.

Also, the density information generation unit 123 can match the passenger density level with one or more of a number, letter, and color, when generating the passenger density information of each car.

For example, a high passenger density can be matched to 1, a medium passenger density can be matched to 2, and a low passenger density can be matched to 3; and a high passenger density can be matched to a red color, a medium passenger density can be matched to a yellow color, and a low passenger density can be matched to a blue color.

The passenger density can be determined according to the proportion of the estimated number of passengers on board with respect to the recommended number of passengers for each car. The passenger density of each car can also be represented as the number of passengers riding on each car.

The density information provider unit 124 can provide the passenger density information of each car generated by the density information generation unit 123 to the display devices 130 at the station, and can also provide the passenger density information of a particular train to a user terminal 140 when a request is received from the user terminal 140 for the passenger density information of the corresponding train.

Figure 3:
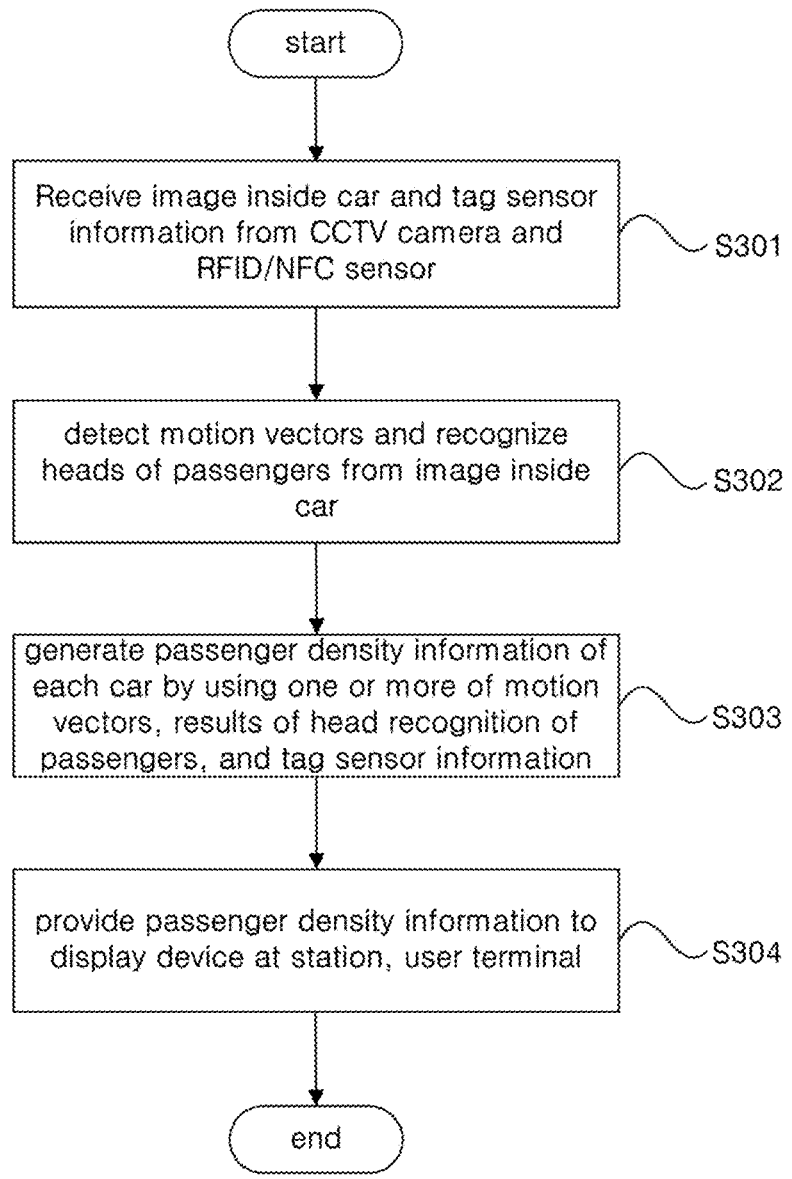
FIG. 3 is a flow diagram illustrating the procedures for providing passenger density information according to an embodiment of the invention.

FIG. 3 is a flow diagram illustrating the procedures for providing passenger density information according to an embodiment of the invention.

The procedures illustrated in FIG. 3 can be performed by the service server 120 illustrated in FIG. 2.

First, the service server 120 may receive the image of inside the car from the CCTV cameras 111 and periodically receive the tag sensor information from the RFID/NFC sensors 112 installed in each car (S301).

Incidentally, the service server 120 can remove redundant tag information within the same car.

After operation S301, the service server 120 may detect motion vectors generated by the movements of the passengers and recognize the heads of the passengers from the image of inside the car (S302).

After operation S302, the service server 120 may generate the passenger density information of each car by using one or more of the motion vectors, the head recognition of the passengers, and the tag sensor information received periodically from the RFID/NFC sensors 112 (S303).

Here, the service server 120 can set different weights on the motion vectors, the head recognition of the passengers, and the tag sensor information according to the operating time, weather, season, operating region, etc., and can generate the passenger density information by matching the passenger density level of each car to one or more of numbers, letters, symbols, and colors.

After operation S303, the service server 120 may provide the passenger density information of each car to a display device 130 at a station and to a user terminal 140 that has requested the passenger density information (S304).

FIG. 4A, FIG. 4B, FIG. 4C, and FIG. 4D illustrate information that may be collected for providing passenger density information according to an embodiment of the invention.

Figure 4A:
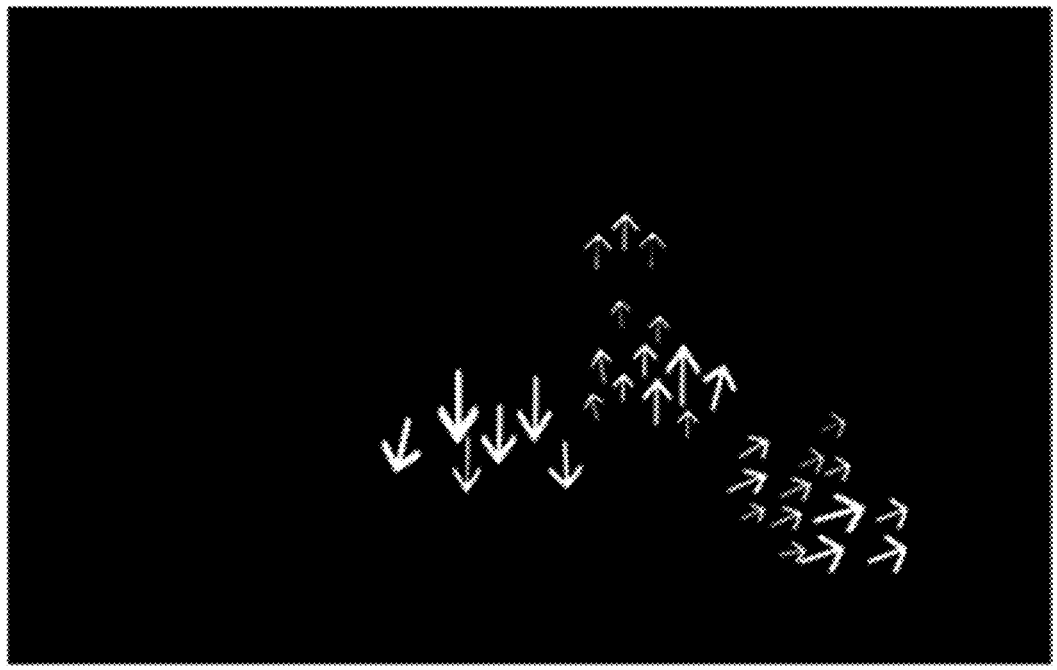
FIG. 4A, FIG. 4B, FIG. 4C, and FIG. 4D illustrate information that may be collected for providing passenger density information according to an embodiment of the invention.

FIG. 4A shows a motion vector image extracted by the service server 120 from the image of inside the car. From this image, the density of passengers in the car can be identified and can be used to increase the accuracy and efficiency of the passenger density information.

Figure 4B:
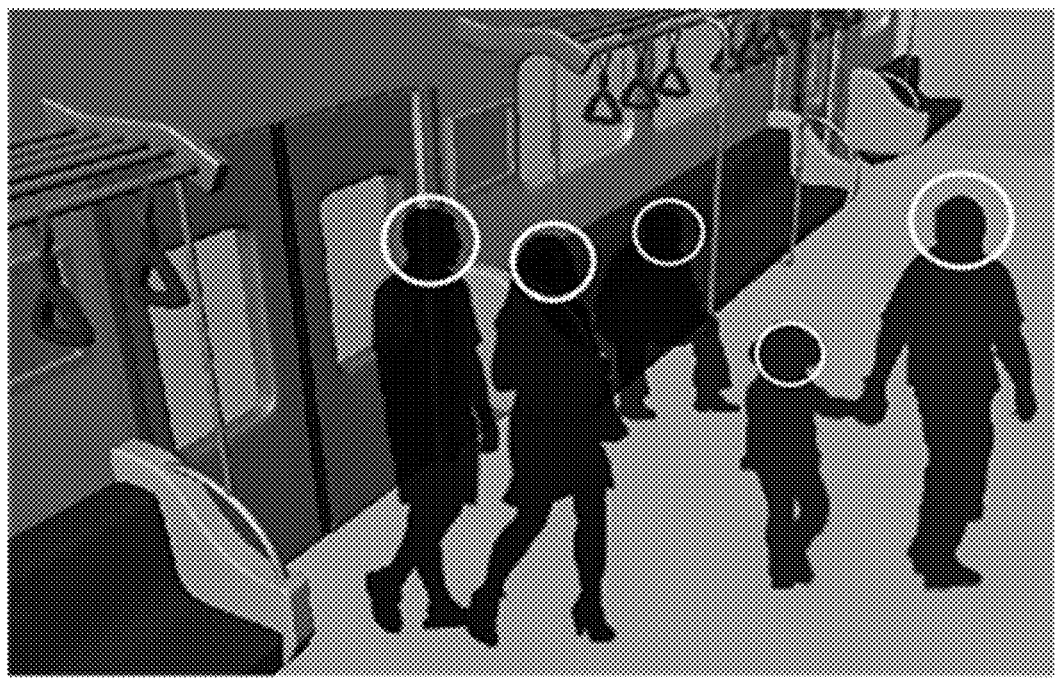

FIG. 4B illustrates the recognizing of the heads of the passengers by the service server 120, where the heads of the passengers can be recognized by detecting head colors from the image of inside the car and filtering by size. The head recognition for the passengers can be used in identifying the number of passengers in a car.

Figure 4C:

FIG. 4C illustrates an RFID/NFC sensor 112 installed at the entrance to a car sensing a smart phone or smart watch including an RFID/NFC tag carried by a passenger. The service server 120 can receive tag sensor information from the RFID/NFC sensor 112 and reflect this information in identifying the number of passengers in the car.

Figure 4D:

FIG. 4D illustrates RFID/NFC sensors 112 installed on the floor of the car sensing smart shoes or antenna bands including RFID/NFC tags worn by the passengers. The service server 120 can receive tag sensor information from the RFID/NFC sensors 112 to estimate the area of floor space occupied by the passengers and can reflect this information in generating the passenger density information.

Figure 5A:
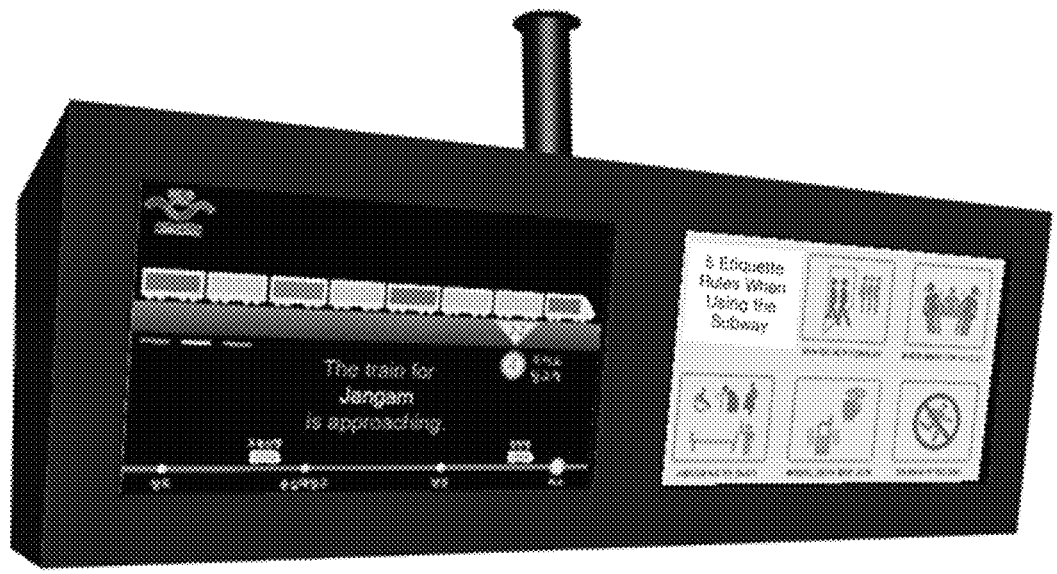
FIG. 5A and FIG. 5B illustrate examples of passenger density information according to an embodiment of the invention.
Figure 5A:
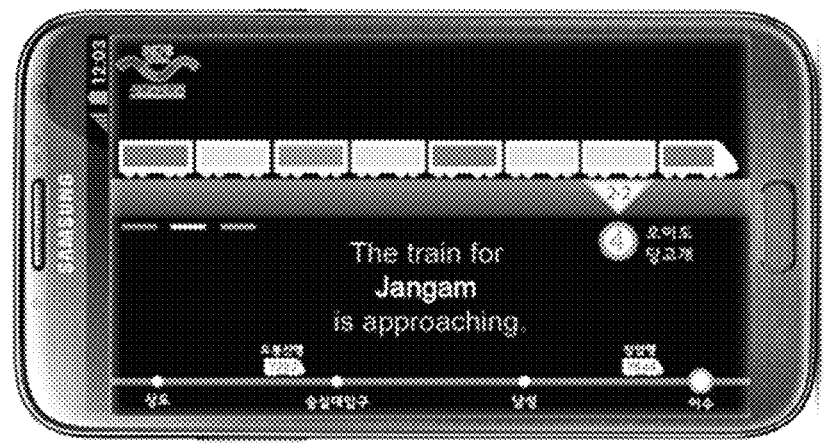
Figure 5B:
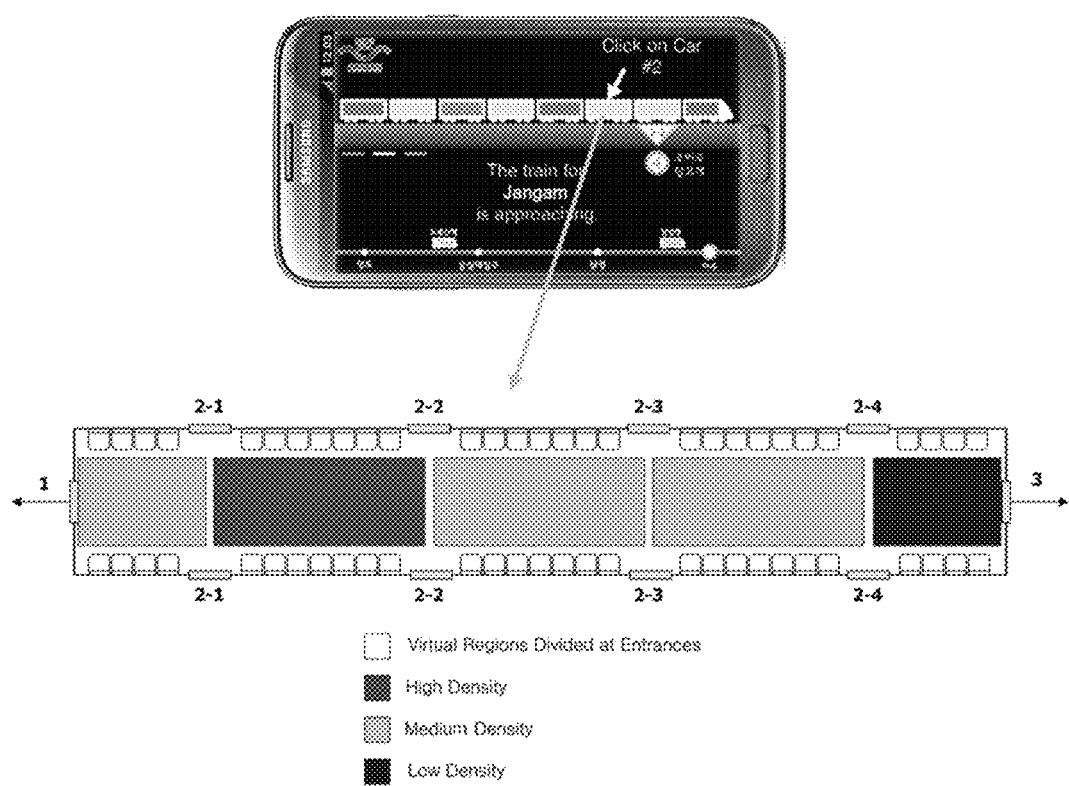

FIG. 5A and FIG. 5B illustrate examples of passenger density information according to an embodiment of the invention.

FIG. 5A illustrates an example of passenger density information displayed on a display device 130 at a station and on a user terminal 140 according to an embodiment of the invention.

In the case of a display device 130 at a station, the passenger density information of a train approaching the corresponding station can be displayed on the screen as illustrated in FIG. 5A.

That is, each car of the train can be matched with a color representing a corresponding density level, according to the level of density of each car.

Also, the user terminal 140 can display the passenger density information of a train approaching a corresponding station on the screen as illustrated in FIG. 5A when the user searches and selects a particular subway station.

FIG. 5B illustrates an example of passenger density information according to another embodiment of the invention.

The passenger density information of FIG. 5B may be the detailed information displayed on the user terminal 140 when a particular car (car #2) of the train is selected from the passenger density information of FIG. 5A.

The detailed passenger density information can be displayed such that the inside of the car is divided at the entrances into a multiple number of virtual regions, with the density level of each region matched with a color as illustrated in FIG. 5B.

That is, even though a car is shown as having a high passenger density level in FIG. 5A, there may be a region of relatively lower density level within the car, and the user can consider this passenger density information to board a desired car.

Incidentally, the density information of each region illustrated in FIG. 5B can be generated by further applying weights to the results of calculating the area of the floor (floor color) in the car from the image of inside the car.

Furthermore, the 'floor area occupied by passengers' as measured based on the tag sensor information received from the RFID/NFC sensors 112 installed on the floor in the car can also be incorporated.

The embodiments of the present invention set forth above are for illustrative purposes. It would be appreciated by those of ordinary skill in the field of art to which the present invention pertains that the embodiments above can be easily modified to other specific implementations without departing from the technical spirit of the present invention and without changing the essential features of the present invention.

Thus, the embodiments described above are merely given as examples and do not limit the present invention.

For example, a component described as an integrated form can be used in a distributed form, while components described as being in a distributed form can be used coupled together.

The scope of the present invention is to be defined by the scope of claims set forth below, and it is to be appreciated that all variations and modifications which can be derived from the meaning and scope of the claims as well as their equivalents are encompassed by the scope of the present invention.

What is claimed is:

1. A service server having a processor installed therein for providing passenger density information of a car, the service server comprising:
   a motion vector detection unit of the processor that detects motion vectors generated by movements of passengers from a captured image of an inside of a car;
   a head recognition unit of the processor that recognizes heads of passengers from the image; and
   a density information generation unit of the processor that generates the passenger density information of the car by using: one or more of the motion vectors, a result of head recognition of the passengers, and tag sensor information received from sensors installed in the car.

2. The service server of claim 1, wherein the density information generation unit generates the passenger density information with different weights applied to the motion vectors, the result of head recognition of the passengers, and the tag sensor information according to one or more conditions of operating time, weather, season, and operating region of the car.

3. The service server of claim 1, wherein the density information generation unit deletes redundant tag sensor information if the received tag sensor information is determined to be redundant.

4. The service server of claim 1, wherein the density information generation unit uses the tag sensor information to estimate a number of passengers in the car or estimate a floor area occupied by passengers in the car.

5. The service server of claim 1, wherein the density information generation unit estimates a floor area occupied by passengers in the car by calculating an exposed floor area in the car.

6. The service server of claim 1, wherein the density information generation unit generates the passenger density information by matching a level of passenger density in the car to one or more of a number, letter, symbol, and color.

7. The service server of claim 6, wherein the density information generation unit divides a space in the car into a plurality of virtual regions and generates the passenger density information by matching a level of passenger density in each of the divided virtual regions to one or more of a number, letter, symbol, and color.

8. The service server of claim 1, wherein the head recognition unit recognizes the heads of the passengers by detecting a color of the head and filtering head sizes,
wherein the head size includes one or more of an aspect ratio and a width of a head shape.

9. The service server of claim 1, further comprising;
a density information provider unit of the processor that provides the passenger density information to one or more of a display device located at a station and a user terminal requesting the passenger density information.

10. A method by which a service server having a processor installed therein provides passenger density information of a car, the method comprising:
detecting, by the processor, motion vectors generated by movements of passengers from a captured image of an inside of a car;
recognizing, by the processor, heads of passengers from the image; and
generating, by the processor, the passenger density information of the car by using: one or more of the motion vectors, a result of head recognition of the passengers, and tag sensor information received from sensors installed in the car.

11. The method of claim 10, further comprising:
providing, by the processor, the passenger density information to one or more of a display device located at a station and a user terminal requesting the passenger density information.

12. The method of claim 10, wherein the generating of the passenger density information comprises generating, by the processor, the passenger density information by matching a level of passenger density in the car to one or more of a number, letter, symbol, and color.

13. The method of claim 12, wherein the generating of the passenger density information comprises dividing, by the processor, a space in the car into a plurality of virtual regions and generating, by the processor, the passenger density information by matching a level of passenger density in each of the divided virtual regions to one or more of a number, letter, symbol, and color.

14. The method of claim 10, wherein the generating of the passenger density information comprises generating, by the processor, the passenger density information with different weights applied to the motion vectors, the result of head recognition of the passengers, and the tag sensor information according to one or more conditions of operating time, weather, season, and operating region of the car.

* * * * *